(12) United States Patent
Nyfors et al.

(10) Patent No.: US 12,253,395 B2
(45) Date of Patent: Mar. 18, 2025

(54) ENLARGED PIPE SECTION FOR MICROWAVE-BASED FLOW MEASUREMENTS

(71) Applicant: Roxar Flow Measurement AS, Stavanger (NO)

(72) Inventors: Ebbe Gustaf Nyfors, Sandnes (NO); Erik Undheim, Bryne (NO)

(73) Assignee: Roxar Flow Measurement AS, Stavanger (NO)

( * ) Notice: Subject to any disclaimer, the term of this patent is extended or adjusted under 35 U.S.C. 154(b) by 264 days.

(21) Appl. No.: 17/800,114

(22) PCT Filed: Mar. 23, 2021

(86) PCT No.: PCT/EP2021/057342
§ 371 (c)(1),
(2) Date: Aug. 16, 2022

(87) PCT Pub. No.: WO2021/191177
PCT Pub. Date: Sep. 30, 2021

(65) Prior Publication Data
US 2023/0073383 A1    Mar. 9, 2023

(30) Foreign Application Priority Data
Mar. 25, 2020    (NO) .............................. NO20200355

(51) Int. Cl.
*G01F 1/66*    (2022.01)
*G01F 1/74*    (2006.01)
(Continued)

(52) U.S. Cl.
CPC ................ *G01F 1/66* (2013.01); *G01F 1/662* (2013.01); *G01F 1/74* (2013.01); *G01F 15/18* (2013.01); *G01N 22/00* (2013.01)

(58) Field of Classification Search
CPC ... G01F 1/66; G01F 1/662; G01F 1/74; G01F 15/18; G01N 22/00; G01N 22/04
See application file for complete search history.

(56) References Cited

U.S. PATENT DOCUMENTS

| 3,146,789 A | 9/1964 | Curth |
| 3,883,798 A | 5/1975 | Free |

(Continued)

FOREIGN PATENT DOCUMENTS

| EP | 2104837 A1 | 9/2009 |
| EP | 1451562 B1 | 4/2016 |

(Continued)

OTHER PUBLICATIONS

Rambaud, Patrick; International Search Report; PCT/EP2021/057342; Dated: Jun. 10, 2021; 4 pages.

*Primary Examiner* — Helen C Kwok
(74) *Attorney, Agent, or Firm* — Bradley Arant Boult Cummings LLP

(57) ABSTRACT

Pipe section for flow measurements including measuring antennas configured to measure predetermined characteristics of fluid inside the pipe section. The pipe section includes an input end and an output end having a predetermined dimension. The pipe section includes a section having a first cross section in a first direction extending beyond the input and output dimension by a predetermined amount and a cross section in the second direction being perpendicular to the first direction having a dimension B being less than the dimension A in the first direction.

11 Claims, 2 Drawing Sheets

(51) Int. Cl.
   *G01F 15/18*       (2006.01)
   *G01N 22/00*       (2006.01)

(56) References Cited

U.S. PATENT DOCUMENTS

| | | | |
|---|---|---|---|
| 5,455,516 | A | 10/1995 | Jean et al. |
| 5,793,216 | A | 8/1998 | Constant |
| 6,917,205 | B2 | 7/2005 | Moller et al. |
| 8,429,985 | B2 | 4/2013 | Furlong |
| 10,175,075 | B2 * | 1/2019 | Eriksson .................. G01F 1/66 |
| 2003/0117149 | A1 * | 6/2003 | Conrads .................. G01F 1/66<br>324/637 |
| 2004/0244501 | A1 * | 12/2004 | Nyfors ..................... G01F 1/74<br>73/861.63 |
| 2012/0006430 | A1 * | 1/2012 | Gentile .................... G01F 1/56<br>324/637 |
| 2014/0283503 | A1 * | 9/2014 | Roesch ................. F01N 11/002<br>60/274 |
| 2015/0115979 | A1 * | 4/2015 | Nyfors .................. G01R 25/00<br>324/633 |
| 2015/0346117 | A1 * | 12/2015 | Nyfors .................. G01N 22/00<br>324/633 |
| 2018/0045662 | A1 * | 2/2018 | Nyfors .................. G01N 22/00 |
| 2018/0113082 | A1 * | 4/2018 | Nyfors ..................... G01F 1/66 |
| 2019/0070547 | A1 * | 3/2019 | Sappok .................. F01N 11/00 |
| 2019/0211735 | A1 * | 7/2019 | Hirose ................... F01N 3/021 |
| 2022/0026376 | A1 * | 1/2022 | Undheim ............. G01N 27/223 |

FOREIGN PATENT DOCUMENTS

| | | |
|---|---|---|
| EP | 2845000 B1 | 6/2016 |
| EP | 2954319 B1 | 10/2017 |
| EP | 3308160 B1 | 2/2019 |
| EP | 3286561 B1 | 7/2019 |
| GB | 2120791 A | 12/1983 |
| WO | WO-9742467 A1 | 11/1997 |
| WO | WO-2008085065 A1 | 7/2008 |
| WO | WO-2019048822 A1 | 3/2019 |

* cited by examiner

ENLARGED PIPE SECTION FOR MICROWAVE-BASED FLOW MEASUREMENTS

The present invention relates to an enlarged pipe section for flow measurements. As a standard venturi is a restriction in the pipe diameter, this could be called an inverted venturi conducting the fluid flow to be measured, and where the pipe section includes measuring probes for monitoring the content and flow conditions, especially for microwave-based permittivity measurements.

A microwave-based multiphase flow meter (MPFM) needs to be able to measure the permittivity both when the flow is either oil-continuous, or the gas volume fraction (GVF) is so high that the losses are low enough that the permittivity can be measured with a cavity resonator, and when the losses are so high that transmission methods must be used. This is discussed in numerous publications such as EP2845000B1, EP2954319B1, EP3308160B1 and EP3286561B1. The measuring system must also be able measure the salinity of the water phase in order to compensate for the effects of the changes in the salinity. In addition, a measurement of density and flow velocity are needed to be able to calculate the composition and the flow rates. The density can be measured e.g. with a gamma densitometer and is not commented any further here as the invention is related mainly to the measurement of the permittivity for the determination of the salinity and the watercut (WC) of the liquid in a multiphase flow.

A solution involving three antennas, which are used both for differential transmission for composition and salinity measurements, and for exciting the resonator has been proposed in EP3308160B1. A specific solution is a cone- or cylinder-shaped insert supported in the centre of the pipe, in which case the flow is directed through the gap between the insert and the pipe.

The structures in the above-mentioned publications include inserts, which generate a differential pressure, which also can be used for velocity measurement. A problem with those solutions is that they are intrusive, adding obstacles to the fluid flow. The present invention therefore concerns a non-intrusive design for the same basic concept of combining a resonator sensor with differential transmission for composition and salinity measurement.

An alternative to intrusive solutions is mentioned in EP1451562B1, showing a pipe section constituting an inverted venturi solution where the diameter of the pipe is increased providing both a resonator and a differential pressure. A similar solution is also discussed in U.S. Pat. No. 10,175,075 in relation to full wave transverse resonances. But such circularly symmetrical resonators have a fundamental problem related to the first, and therefore often preferred resonance mode to use, as explained below. There are two reasons why the first mode is preferred. One is that the resonant frequency needs to be lower than the cut-off frequency in the pipe 2 to be contained in the resonator. If a higher mode is used, the enlarged section needs to be enlarged even more to achieve this, which reduces the flow velocity unnecessarily and may cause unwanted instability in the flow. The other reason is that the distance in frequency to other peaks will be smaller for higher modes, increasing the risk of not identifying the right peak under highly dynamic conditions. A solution having this problem is illustrated in U.S. Pat. No. 5,455,516. The resonator in this publication is not an inverted venturi but has a substantially larger section in one dimension which will separate the resonance frequencies in that direction but the difference between the modes will be too small for practical measurements.

The present invention is defined more specifically in the accompanying independent claims.

A novel design has been achieved combining resonator and differential transmission measurements in a non-intrusive design, which also provides flexibility in antenna positions as well as pipe dimensions as the antenna may in a preferred embodiment be mounted in a flat pipe wall without any adaptations to curvature or other problems. In addition, no dielectric pipe or composite material filling is needed as in some previously proposed non-intrusive designs.

The invention will be discussed more in detail below with reference to the accompanying drawings, illustrating the invention by way of examples.

Figure 1:
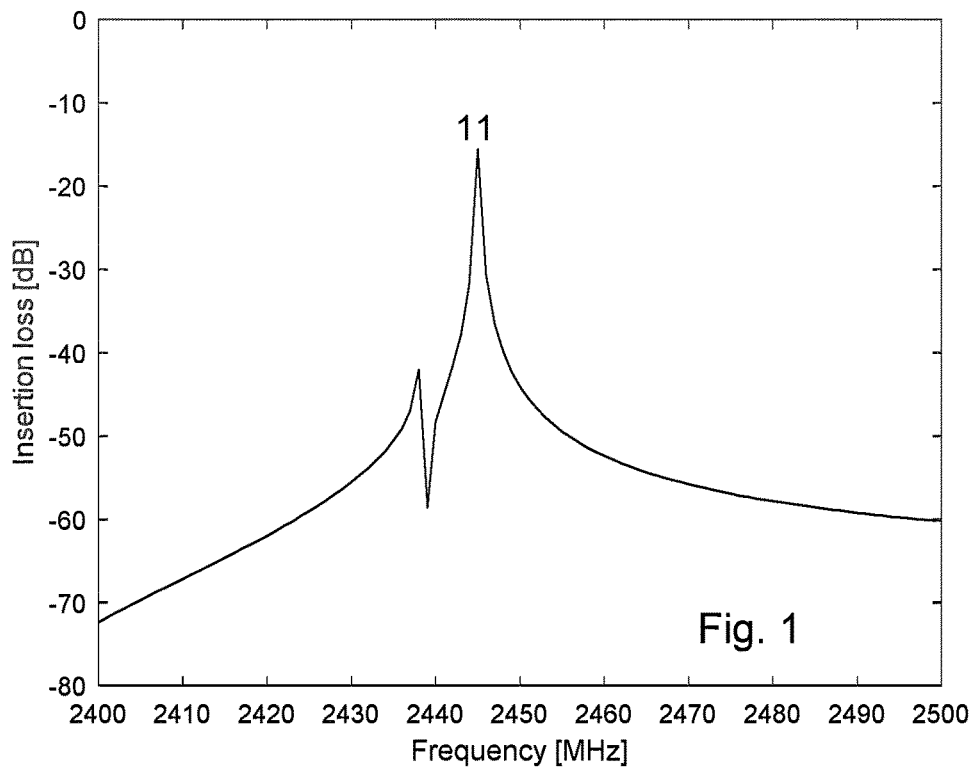
FIG. 1 illustrates a corrupt resonance peak measured in an inverted venturi according to the known art.

As stated above, the inverted venturi solution is well known, e.g. from above-mentioned EP1451562B1 and U.S. Pat. No. 10,175,075, but the basic cylindrical geometry has the problem that the lowest waveguide mode to form resonances (TE11) is not circularly symmetrical, but does not have a predefined orientation. This means that two orthogonal modes can exist. They are independent, but they have the same resonant frequency. An inhomogeneity in the flow may shift the independent resonance frequencies and cause them to interfere with each other resulting in a corrupt combined resonance peak as illustrated in FIG. 1 as a split resonance peak 11. Even a simulation in HFSS (High Frequency Structure Simulator, a simulation program based on the finite element method) with an empty sensor shows that the peak is split in the middle.

Figure 2:
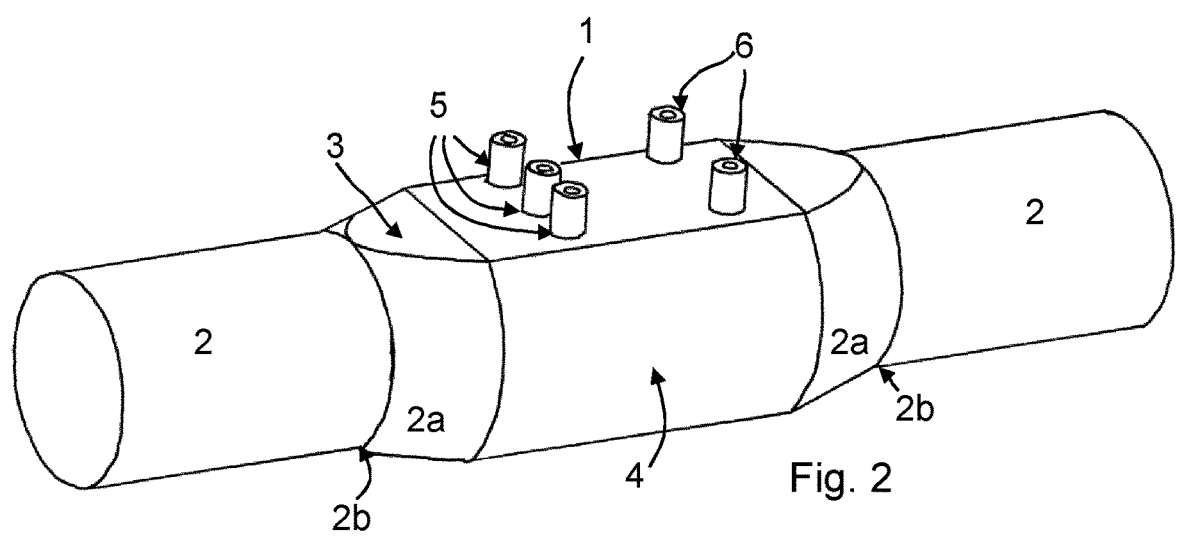
FIG. 2 Illustrates a preferred embodiment of the present invention with two opposite flat surfaces resulting in a clean resonance.

Referring to FIG. 2 the present invention is related to a modification to the pipe section 1 constituting a modified inverted venturi with a larger cross section than the cross section at the input and output ends 2b of the pipe section 1, the term "cross section" in the present application being used indicating the dimensions perpendicular to the pipe and flow direction. The pipe section 1 is positioned between two pipe 2 sections conducting a fluid flow with a transition zone 2a having a predetermined length. Instead of a circular cross section, as is known in the prior art, the cross section of the illustrated embodiment is a combination of a circular and linear cross section parts so that there are two opposite flat surfaces 3, and two opposite arc-shaped surfaces 4, the latter having a larger separation than the former. This has several advantages, e.g.:

The orthogonal resonances are separated in frequency so that each peak is clean.

Three or more antennas 5 for measuring both transmission and resonance can be located on the flat surface 3, and exactly the same configuration can be used for several pipe diameters. Any desired configuration can be used, e.g. triangular, axial or transverse linear.

A surface sensitive cavity resonator sensor, e.g. as described in EP2104837, can easily be integrated on one of the flat surfaces.

The design has no theoretical flow velocity limitation.

There is no dielectric pipe, sleeve, insert or filling in the cavity.

Figure 4:
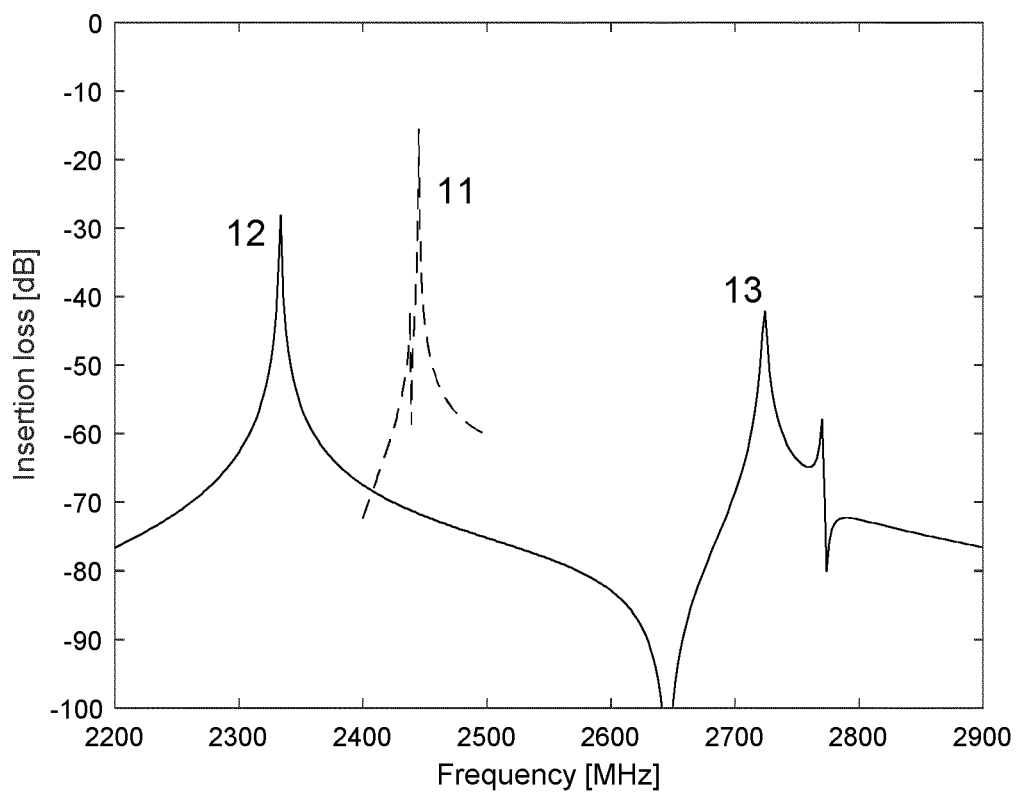
FIG. 4 Illustrates the frequency response of the design in FIGS. 2 and 3a with a flat top and bottom.

The frequency response resulting from the design shown in FIG. 2 shows two clearly separated clean peaks 12, 13 as is shown in FIG. 4, which also shows the split peak response 11 of the cylindrical design from FIG. 1 with broken lines for reference.

More in detail the frequency response of the design in FIG. 2, with a flat top 3 and bottom, has a clean first resonance peak with enough distance to the next peak to avoid confusion between peaks under highly dynamic flow conditions. This distance can be changed by changing the aspect ratios of the design. The two resonance peaks may be used for measuring the characteristics of the flow as disclosed in EP3286561B1.

Figure 3A:
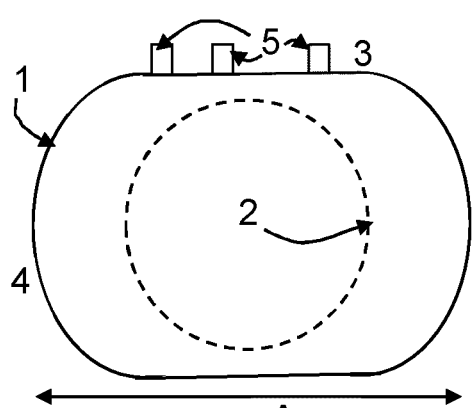
FIG. 3a-3c illustrates different alternative cross sections according to the invention.
Figure 3B:
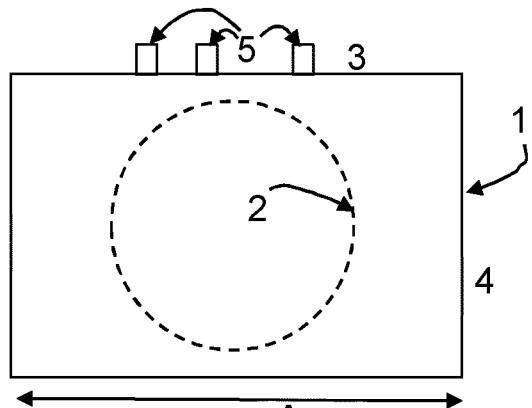
Figure 3C:
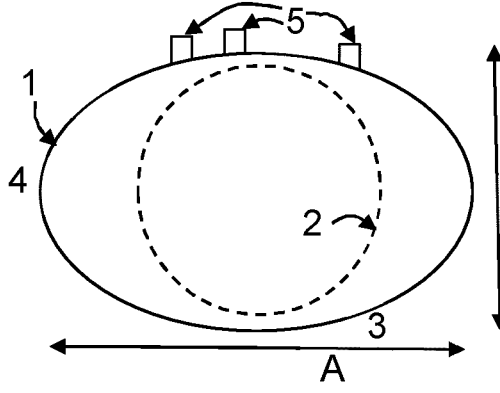

As illustrated in FIG. 3a-3c, other shapes of the pipe section can be contemplated, e.g. having an elliptic (FIG. 3c) or rectangular cross section (FIG. 3b) or alternatively where the surface adapted to receive the antennas 5 has a standardized curvature suitable for the selected antennas while the curvature in the perpendicular direction is different. The main aspect being that the two peaks are clearly separated and the orientation of the resonating field relative to the cross section is defined.

The area of the cross section in the pipe section 1 according to the invention is preferably larger than the area of the cross section of the rest of the pipe 2 so as to be non-intrusive in the fluid flow, but a solution where the area is unchanged along the pipe and pipe section may also be contemplated for example if no pressure variations are wanted in the flow.

As an illustration, referring to FIG. 3b, a pipe section is illustrated defining a rectangular wave guide with dimensions A×B where A>B, A being the distance between the first two opposing surfaces 4 and B being the distance between the second two opposing surfaces 3. The cut-off frequency for the first mode where A corresponds to half the wavelength and the next will be when A corresponds to a full wavelength. The orthogonal mode has a cutoff frequency where B corresponds to half a wavelength. If A=2B the two next modes will have the same cutoff frequency, being twice the first mode. Therefore, waveguides often have this proportion and an octave is obtained where only one mode can exist. According to the present invention an intermediate solution is preferred where B<A<2B, obtaining resonance modes reflected by the opposing surfaces each providing a different standing wave. A longer distance, A>2B, will result in a long resonator where the resonances are too close. Thus, the dimensions should be chosen so as to obtain a reasonable separation between the resonance modes.

The multiphase flow measurement (MPFM) concept is thus based on measuring the water cut (WC) and the salinity under high-loss conditions in the liquid locally at the wall using probes or antennas 5 instead of trying to measure the effective permittivity of the whole flow, which is heavily affected by varying flow regimes. But if desired, additional receiver antenna(s) can be mounted on the opposite wall. However, tests with the surface sensitive salinity sensor indicate that the enlargement of the pipe will make the liquid flow close to the wall facilitating the measurement of the salinity and the local WC.

Two additional antennas 6 positioned in the flow direction may be used for cross correlation, e.g. as shown in FIG. 2. If they are located on opposite walls, the measured velocity represents the average velocity across the flow. If they are located on the same wall the measured velocity represents the velocity closer to the wall, but the received signal is stronger.

The position of the main antennas in FIG. 2 may be chosen as discussed in EP3308160B1 so that the transmission measuring antenna is positioned in a minimum of at least one of the higher resonance modes in the venturi to reduce the interference from the resonances while performing transmission measurements under moderately lossy conditions.

As is understood from the discussion above the present invention solves a fundamental problem related to exciting the lowest resonance in a basically cylindrical cavity without using any cone, fin, or other insert, while providing some extra advantages related to using the same geometrical antenna configuration on several pipe sizes, and allowing the combined use for measurement of resonance and differential transmission. The main advantage of being able to use the same antenna configuration on several pipe sizes is that the same models for extracting the watercut and the salinity can be used without extra pipe size related modifications. This reduces the need for testing and calibration, which is expensive and time consuming.

The invention requires no dielectric material (pipe, sleeve or filling) in the cavity which could absorb water, be affected by the fluids over time and have temperature dependent properties that needs to be compensated for. Neither does the invention have any velocity limit.

To summarize, the present invention relates to a pipe section for flow measurements including measuring antennas configured to measure predetermined characteristics of fluid inside the pipe section. The pipe section includes an input end and an output end having a predetermined dimension. The pipe section comprising a section having a first cross section in a first direction extending beyond the input and output dimension by a predetermined amount and a cross section in the second direction preferably being perpendicular to the first direction having a dimension B being less than the dimension A in the first direction.

While in the present invention two perpendicular directions in the resonator is discussed, providing two different resonance conditions, other solutions may be contemplated, where the shape of the cross section may be chosen so as to obtain more than two resonance frequencies or to adapt to other sypes of measurements and conditions.

According to one embodiment the pipe section is constituted in the first direction of two opposing curved pipe walls and may in the second direction be constituted by two opposing plane pipe walls. In the latter case at least one of said antennas are mounted in said plane walls.

The antennas are preferably microwave measuring antennas configured to measure resonance and/or transmission characteristics of microwave signals in said pipe section.

The cross section in the second direction may have a dimension being between the cross section of the input and output and the dimension in the first direction. The pipe section thus being larger than the input and output pipes in both directions, but where the dimensions in the first and second direction is not the same.

Preferably the first and second dimensions are chosen so as to provide an area of the cross section being at least the same as the area of the pipe cross section and preferably larger.

The invention claimed is:

1. A pipe section for flow measurements comprising:
at least one measuring microwave antenna configured to measure predetermined characteristics of fluid inside the pipe section;
wherein the pipe section comprises an input end and an output end, the ends having a cross section with a predetermined dimension, the pipe section constituting a microwave resonator and having a first cross section perpendicular to a pipe and flow direction in a first direction having a dimension A extending beyond the dimension of the input and output ends by a predetermined amount and a second cross section perpendicular to the pipe and flow direction in a second direction having an angle relative to the first direction and having a second dimension B being less than the dimension A, wherein the first and second directions are chosen so that B<A<2B, obtaining resonance modes reflected by opposing section surfaces each providing a different standing wave; and wherein the at least one antenna is mounted in the surfaces and configured to measure at least one resonance frequency indicating the characteristics of the fluid.

2. The pipe section according to claim 1, wherein the first dimension A is chosen to correspond to half the wavelength of a first resonance mode of a microwave signal.

3. The pipe section according to claim 1, wherein the pipe section constitutes an inverted venturi.

4. The pipe section according to claim 1, wherein the pipe section in at least one of the directions is constituted by two opposing curved pipe walls.

5. The pipe section according to claim 2, wherein the pipe section in the at least one of the directions is constituted by two opposing plane pipe walls.

6. The pipe section according to claim 5, wherein at least one of the at least one antenna is mounted in the plane walls.

7. The pipe section according to claim 1, wherein the at least one antenna comprises at least two microwave measuring antennas configured to measure resonance and/or transmission characteristics of microwave signals in the pipe section.

8. The pipe section according to claim 1, wherein the cross section in the second direction has a dimension being between the cross section of the input and output ends and the dimension in the first direction.

9. A system for measuring characteristics of a fluid flow comprising a pipe section according to claim 1, wherein the at least one measuring antenna comprises a least one resonance measuring antenna configured to measure at least one electromagnetic resonance in the pipe section.

10. The system according to claim 9, wherein the at least one measuring antenna comprises at least one transmitter and one receiver, the system configured to measure the transmission time between the transmitter and receiver.

11. The pipe section according to claim 1, wherein the angle is 90 degrees.

* * * * *